United States Patent [19]
Albert et al.

[11] Patent Number: 6,111,633
[45] Date of Patent: Aug. 29, 2000

[54] POLARIZATION INDEPENDENT OPTICAL SWITCHING DEVICE

[75] Inventors: Richard Albert; Anthony P. Baker, both of Santa Rosa, Calif.

[73] Assignee: SpectraSwitch, Inc., Santa Rosa, Calif.

[21] Appl. No.: 09/022,753

[22] Filed: Feb. 12, 1998

[51] Int. Cl.[7] .............................. G02F 1/13; G02F 1/1347; H04J 14/08
[52] U.S. Cl. .............................. 349/196; 349/74; 359/139
[58] Field of Search ..................... 349/196, 74; 359/139, 359/256; 385/16

[56] References Cited

U.S. PATENT DOCUMENTS

| | | | |
|---|---|---|---|
| 4,815,827 | 3/1989 | Lane | 350/347 |
| 4,836,657 | 6/1989 | Gunji et al. | 350/350 |
| 4,989,941 | 2/1991 | Soref | 350/96.18 |

*Primary Examiner*—William L. Sikes
*Assistant Examiner*—Tarifur R. Chowdhury
*Attorney, Agent, or Firm*—Gray Cary Ware & Freidenrich LLP

[57] ABSTRACT

The present invention provides for a polarization independent optical switch for selectively switching an optical signal from at least one input port to a preselected one of a plurality of different output ports. The optical switch operates to transmit all of the optical signal from an input port to a predetermined one of the output ports without first segmenting the optical signal into two polarizations.

8 Claims, 7 Drawing Sheets

VOLTAGE V APPLIED

NO VOLTAGE APPLIED

POLARIZATION INDEPENDENT OPTICAL SWITCHING DEVICE

FIELD OF THE INVENTION

This invention relates to the field of switches. More particularly, the present invention relates to the field of optical switches for controllably directing the path of an optical signal.

BACKGROUND OF THE INVENTION

The use of optical fibers, particularly as a telecommunication transmission medium, has numerous advantages over existing telecommunication media. For example, optical fibers can sustain a broader bandwidth signal and hence, can convey larger quantities of information over the same time period. Further, light waves used in optical fibers have even shorter wavelengths than the conventional microwaves commonly used in telecommunication systems. Thus, a reduction in the physical size of related components is achievable. This size reduction further can result in an overall cost reduction for materials, packaging and manufacturing. Still further, optical fibers exhibit little or no electromagnetic or radio frequency radiation thus resulting in a negligible environmental impact. Conversely, optical fibers are relatively insensitive to electromagnetic and radio frequency interference from the surrounding environment.

To be viable, every telecommunication system must include some means for controllably redirecting a signal, or at least a portion thereof, to or from a transmission medium or between one, or more, such media. In the case of an optical telecommunication system the redirecting means is an optical switch. Currently, optical switches are generally mechanical in nature. Unfortunately, mechanical switches require relatively high driving power and are subject to wear, abrasion and fatigue. As a result, mechanical switches are prone to failure after repeated use. In addition, since a rather small optical fiber is usually displaced from alignment between output port fibers (or input port fibers), mechanical switches can easily become expensive. One particular reason for this expense is the very small tolerances required to ensure the proper alignment between the optical fibers moved and the optical fibers associated with the ports.

Solid-state switches based on an electrooptic or magnetooptic principle have also been used and are inherently more reliable, but these switches are subject to greater crosstalk and insertion loss.

Recently, optical switches have been proposed as an alternative to mechanical switches. Typical of such liquid crystal optical switches are those described in U.S. Pat. Nos. 4,792,212; 4,790,633; and 4,813,796, each to Baker. Baker's patents describe related polarization dependent optical switches. By polarization dependent, it is meant that the switches divide the light signal into two mutually orthogonal and incoherent planes of vibration. Baker's switches include optical fibers 88 attached to the side angled surfaces 24, 32, 70, and 78 of a pair of opposed trapezoidal prisms 20 and 28 and a pair of opposed parallelogram shaped prisms 66 and 74. Each of the four prisms are arranged with their bases parallel to each other and with a passive liquid crystal material 36 and 82 displaced therebetween. Between the top two prisms 20 and 66, and the bottom two prisms 28 and 74, is an active liquid crystal material 50. Electrodes 54 and 56 are coupled to this active liquid crystal material 50 for generation of an electric field by application of a voltage.

Light enters either of two prisms 20 or 28 through either input ports 38 or 40, respectively. By altering the applied voltage to the liquid crystal material 50, the switch controls whether the light will exit the switch through surface 70 or 78. The applied voltage is varied between zero and a finite predetermined value.

By way of example, consider an optical signal entering the switch through side 24 into prism 20. Due to the angle of the surface 24, the light is directed toward the beam splitter 36 which is a passive liquid crystal material (i.e. no voltage is applied to this material). The passive liquid crystal material 36 splits the light into first and second polarized components wherein the first polarized component passes through to the opposing prism 28 while the second polarized component is reflected. The reflected component is reflected to the active crystal material 50. By applying a voltage to the active liquid crystal material 50, the polarization of the second component is reoriented.

The second light component is transmitted to the active liquid crystal material 50 which separates the bottom two prisms 28 and 74 from each other. By applying a voltage to this active material, the polarization of the second component can likewise be altered. The two components are then directed to the passive beam combiner 82 which combines the first and second components as they are directed to the appropriate exit ports located at surfaces 70 and 78.

Because Baker's switches utilize liquid crystal material that is polarization dependent, they resolve light into two mutually orthogonal and incoherent planes of vibration. This resolution of light into two perpendicular planes occurs naturally whenever light reflects off any surface.

FIGS. 1a and 1b illustrate the spacial relationship, in a cartesian coordinate system, between the propagation direction of the light signal as compared with the electric field and the magnetic field in an optical switch. FIG. 1a depicts the electric field perpendicular to the plane of incidence. FIG. 1b has the electric field E in the plane of incidence. Reflectance is not the same for these two polarizations. The electric field vector transverse to the plane of incidence has the larger reflectance.

Two vectors specify an electromagnetic wave, the electric field: E, and the magnetic field: H. The vector K specifies the propagation of the light signal. The vectors E', H' and K' represent the electric field, magnetic field and light signal vectors, except, here they are for the light signal after it has reflected off of the liquid crystal material surface represented by the X-axis. The vectors E", H" and K" represent the electric field, magnetic field and light signal vectors, except, here they are for the light signal after it has passed through the liquid crystal material.

The electric field E and magnetic field H are interdependent. Their space and time derivatives are interrelated in a manner expressed by the Maxwell equations. Changes in the fields E and H propagate a wave through space. The electric and magnetic fields are perpendicular to one another, and perpendicular to the direction of propagation, K. It is traditional in optics to designate the direction of the electric field as the direction of polarization. In the phenomena of reflection and refraction of light, the electric field resolves into components perpendicular and parallel to the plane of incidence (X-Y plane).

The geometry is defined by two other orthogonal planes, the surface plane and the plane of incidence. The plane of incidence contains the light ray. The light ray intersects the surface. The angle the light ray makes with the normal to the surface is the angle of incidence.

FIG. 2 illustrates the angle of incidence $\theta_i$ and angle of reflection $\theta_r$ in relation to the plane of incidence 4 and the interface 2. The interface 2 is sandwiched between Media 1 (the region above the interface) and Media 2 (the region below the interface). Media 1 represents, for example, a top prism while Media 2 represents, for example, a bottom prism. The interface could be a liquid crystal material sandwiched therebetween. Light travelling in Media 1 and in the plane of incidence 4 meets the interface 2 at an angle $\theta_i$. Part of the light reflects off the interface at an angle $\theta_r$ where $\theta_r=\theta_i$. The rest of the light enters the Media 2 making a refraction angle $\theta_t$ with respect to the interfacial normal.

The light wave vibrating parallel to the interface has a different reflectivity than light vibrating normally to the surface. The reflected light has slightly more of the perpendicular component. At special angles, all of the reflected light has the parallel polarization. A common example of this can be seen in polarized sunglasses which block out this parallel polarized reflected light thus eliminating glare.

The reflecting surface in all other optical switches is a polarizing beam splitter. The polarizing beam splitter separates light into two planes of polarization. The two planes of polarization are perpendicular to the direction of light propagation. Depending on the state of the beam splitter either one or both polarizations reflect. Transition between these two states constitutes optical switching. For a liquid crystal beam splitter, an electric field forces the change of states. All other optical switches move between these two states by varying the applied voltage from zero to a predetermined finite value. This is illustrated in FIG. 3. When a voltage is applied across the liquid crystal material 12 in the prior art devices, the orientation of the molecules 14 is changed thereby redirecting the optic axis. The optic axis is the longitudinal axis of the molecules within the liquid crystal material. This changes reorients the molecules between orientations perpendicular and parallel to the longitudinal plane of the liquid crystal material 12. This changes the refractive index of the liquid crystal material. When the molecules 14 are perpendicular to the longitudinal axis, as shown in FIG. 3A, the light signal 16 transmits through the liquid crystal material. When the molecules 14 are parallel to the longitudinal axis, however, the light signal 16 is reflected.

Unfortunately, when the molecules are perpendicular to the longitudinal axis, on a portion of the light signal is transmitted through the liquid crystal material. A portion of the light signal is also reflected. This results in a failure to totally switch the light from one exit port to another. When molecules are parallel to the longitudinal plane, both planes of polarization reflect. When the molecules are perpendicular to the longitudinal plane, one polarization reflects; whereas, the other polarization passes through the beam splitter. Therefore, instead of going from 100% on to 100% off, the switch goes from 100% on to 50% on.

Furthermore, the change in states (i.e. from parallel to perpendicular) is not a transition between a totally ON to a totally OFF state. Rather, this is a transition from nearly totally ON to partially OFF. If light had only one rather than two polarizations, then a single beam splitter would switch from totally ON to totally OFF. Other devices eliminate one of the polarizations or have two beam splitters or have a means for converting one polarization into another. It is key to note that all of these optical switches manipulate the light signal's polarization. The left over polarizations at the first beam splitter indicate that all other switches are polarization dependent.

There are many drawbacks to the optical switches described in the Baker patents. The Baker switches have four prisms, two beam splitters and two controlled retardation cells which each require precise alignment for proper light transmission and switching. This requires considerably more effort to build and maintain. The controlled retardation cell also requires precise alignment with regard to the three Eulerian angles in order to minimize crosstalk. The controlled retardation cell introduces additional regions of insertion loss at the cell/prism interface. Minimization of insertion losses at this interface requires antireflection coatings on the prism surfaces. The controlled retardation cells also require precise cell spacing to insure proper phase retardation. Finally, the Baker switch requires three voltage levels to control the switching.

In addition to the four prism design of Baker, a two prism, polarization dependent design is presented in Skinner, J., Lane, C. H. R., "A Low-Crosstalk Microoptic Liquid Crystal Switch," IEEE *Journal On Selected Areas In Communications*, 6(7):1178–1185 (1988). Skinner describes a polarization dependent optical switch that incorporates two trapezoidally shaped glass prisms of equal refractive index $n_g$ and with a base angle A. The inside faces of the prisms are coated with a transparent electrode (commonly indium tin oxide) and a thin polyamide layer.

The polyamide layers are rubbed in antiparallel directions along the y-axis to induce subsequent OFF state alignment of the liquid crystal (homogenous alignment). The prisms are then bonded together using an epoxy edge seal loaded with spacers of the desired diameter (typically a few microns). Liquid crystal is introduced into the space between the prisms by vacuum filling, and the cell is sealed.

The principle of operation includes an ON state wherein the light is transmitted and an OFF state wherein the light is reflected. In the ON state, a voltage is applied between electrodes, and the liquid crystal is aligned normal to the prism faces, so that "p" polarized incident light sees a refractive index approaching $n_e'$ a value near the greater of the two liquid crystal indexes. The prism index and base angles are chosen such that:

$$n_g = n^1{}_e{}'$$

and $$\frac{1}{n_g^2} = \frac{\sin^2 A}{n_e^2} + \frac{\cos^2 A}{n_0^2}$$

where $n_o$ and $n_e$ are the ordinary and extraordinary indexes of the liquid crystal, respectively. In this case, the polarized light encounters no optical discontinuity at the liquid crystal sandwich, and is entirely transmitted along path B.

In the OFF state, the liquid crystal molecules tend to align with their long axes parallel with the direction of the microscopic scratches formed by rubbing the thin polyamide layer. In this case, the polarized input light sees a refractive index $n_0^1$ and if $n_g$ and A are chosen such that:

$$\sin A \geq \frac{n_0}{n_g}$$

where:

$$\frac{1}{n_0^2} = \frac{\cos^2 A}{n_e^2} + \frac{\sin^2 A}{n_0^2}$$

then the light undergoes total internal reflection, and is reflected along path A.

A problem with Skinner is that it operates with a 3 dB polarization loss. This is because it discards the perpendicular polarization (i.e. it is polarization dependent). By throwing away one of the polarizations (i.e. 50% of the power transmission) 50% of the input intensity is lost. This becomes of critical importance when the light signal travels through a switching network. The result is a limitation on the number of switches possible in the network.

Furthermore, the Skinner switch operates between a powered ON and a powered OFF state. This results in bounce which describes diminishing ON and OFF cycles as the power is turned off. Furthermore, optimum performance occurs at 100 Volts p/p. This is due to the ON state field driving the molecules from a parallel to a perpendicular alignment. Only at very high field strengths is this possible.

Another polarization dependent optical switch is presented by Meadows, M. R., et al., "Electro-optic Switching Using Total Internal Reflection By A Ferroelectric Liquid Crystal," *Appl. Phys. Lett.*, 54(15):1394–1396 (1989). Meadows describes another polarization dependent optical switch that incorporates two trapezoidally shaped prisms with their bases positioned opposite each other. An optically transparent electrode covers the two bases and sandwich a ferroelectric liquid crystal (FLC) film. An applied DC electric voltage of approximately $10V/\mu m$ of film thickness selects between two optic axis orientations, both lying nearly parallel to the plane of the film, but differing by up to 90 degrees. The polarity of the applied field determines which orientation is selected. If the optic axis is switched to the second direction, the light is decomposed into an ordinary ray which sees the principle refractive index $n_\omega$ and an extraordinary ray which sees the refractive index.

$$n_e = \sqrt{n_\in^2 [1 - (n_\in^2 - n_\omega^2)/n_\omega^2 \sin^2\psi \sin^2\theta]}$$

Where $\theta$ is the angle of incidence. Common FLCs are positive uniaxial with $n_e \geq n_\in > n_\omega$ so it is possible to choose $\theta$ to be beyond the critical angle for both rays. This requires:

$$\theta > \arcsin[n_\omega^2 / (n_\in^2 \sin^2\psi + n_\omega^2 \cos^2\psi)]^{1/2}$$

and causes the incident light to experience total internal reflection (TIR). This is the OFF state.

When p-polarized light is incident, the electric field is perpendicular to the optic axis in the ON state: the light experiences the index $n_\omega$ and TIR. In the ON state, the light gives rise to the same two rays as does the s-polarized light, and also experiences TIR. Thus, p-polarized light is reflected in both the ON and OFF states.

The resulting switch switches the s polarized light component of the incident light between transmission and reflection while always reflecting the p-polarized light component.

In the fabrication process, one of the two optic axis directions is made perpendicular to the plane of incidence of the light to be switched. The other optic axis direction is still in the plane of the film but is rotated by the angle $\psi$. Therefore, supposing that the applied field selects the perpendicular direction. When s linearly polarized light falls on the film, its electric field is parallel to the optic axis for the light becomes an extraordinary ray which sees the principle refractive index $n_e$, then the light will cross the FLC film. This is the ON state.

A drawback with Meadows' switch is that in the ON state, it is a beam splitter. This means that the p-polarization reflects while the s-polarization transmits through the device. Therefore, there is no total transmission of the light signal. Furthermore, the Meadows switch utilizes a smectic ferroelectric liquid crystal film. A drawback of this film is that it is difficult to remove domain imperfections which contribute to crosstalk. Still further, the optic axis of the liquid crystal film rotates in a plane parallel to the film layer. Rotation in the plane parallel to the film layer does not permit full on and off switching. Furthermore, rotation in a plane requires interdigitated electrodes or ferroelectric liquid crystal material. Interdigitated electrodes are on the same inner glass surface. These electrodes develop a field within the same surface rather than between the two inner glass surfaces. The field generated by the interdigitated electrodes twists the optic field parallel to the glass surface. It is difficult to form a single domain with ferroelectric liquid. Zig-zag walls and imperfections in the ferroelectric liquid crystal are difficult to avoid. The alignment of the smectic layer changes discontinuously across a zig-zag wall producing refractive index discontinuities and poor extinction.

A double-pass optical switch is described in Soref, Richard A., McMahon, D. H., "Total Switching of Unpolarized Fiber Light With a Four-Port Electro-Optic Liquid-Crystal Device," *Optical Society of America*, 5(4):147–149 (1980). The optical switch described by Soref also includes two trapezoidally shaped glass prisms having a transparent electrode layering their bases. The bases then sandwich a liquid crystal material therebetween.

To accomplish total switching, it is necessary to align the nematic liquid crystal molecules in the plane of the layer at 90 degrees to the light propagation direction for the V=0 state. This is in contrast to previous devices wherein the liquid crystal material's optical axis coincided initially with the propagation. The double-pass switch also requires internal reflection of both polarizations. This is accomplished by specular reflection at glass-air interfaces.

Soref's switch uses unpolarized light as the input signal. However, it processes the input signal by separating it into two orthogonal polarizations. These polarizations are launched into the switch's wave guides, selected, and then recombines them to form an unpolarized light signal. The selection event decides whether to convert or not convert one polarization into the other.

Meadows in the third paragraph cites authors, Krashnow, and Soref. Krashnow at General Electric was the first to publish a paper using liquid crystal in a switch. The Krashnow switch used polarized light. Soref modified the Krashnow design to use unpolarized light as input. Soref did this by designing a switch with two optical components. The first optical component, a beam splitter broke light into two polarizations. The second component, beam combiner recombined the polarizations. This exemplifies that Soref's switch is polarization dependent.

What is therefore needed is an efficient optical switch that resolves the drawbacks described above.

SUMMARY OF THE INVENTION

It is the object of the present invention to provide a simple switch for coupling light from one input optical fiber to two or more output optical fibers. It is another objective of this invention to control the propagation of a light signal without polarizing the signal. The switch accomplishes its objectives by introducing a light signal emanating from the input fiber onto a liquid crystal material at a critical angle A. The orientation of the optic axis of the liquid crystal determines the selected output fiber to which the light signal is directed. The orientation of the optic axis is either perpendicular to the longitudinal plane of the liquid crystal layer or aligned parallel to the direction of propagation of the light signal. A light signal meeting the optic axis in an alignment perpendicular to the liquid crystal layer totally reflects; whereas, light travelling parallel to the optic axis passes through the liquid crystal layer. Applying an electric field across the liquid crystal layer changes the orientation of the optic axis from the perpendicular to the parallel arrangement. When the refractive index of the glass is greater than both the ordinary index $n_o$ and the extraordinary index $n_e$, the critical angle A is then the ARCSIN of the liquid crystal extraordinary refractive index to the glass index. When the refractive index of the glass is greater than the ordinary but smaller than the extraordinary index, then the critical angle A is the ARCSIN of the effective refractive index to the index of the glass. The effective refractive index is an average given by $COS^2 A/n_e^2 + SIN^2 A/n_o^2$.

The liquid crystal material used in the present invention is not a beam splitter. The component does not split light into two polarizations. Incident light either reflects totally or transmits totally.

The present invention provides for an optical switch, comprising: an input port; a first output port; a second output port; and a switchable element disposed between the input port and the first and second output ports, the switchable element being switchable between a transparent state in which all of the light from the input port is transmitted through the switchable element to the first output port, and a reflective state in which all of the light from the input port is reflected from the switchable element to the second output port. The switchable element can comprise a liquid crystal that is switchable between the transparent state and the reflective state.

It is contemplated that the optical switch include molecules in the liquid crystal which are aligned substantially parallel to light from the input port when the liquid crystal is in the transparent state; the liquid crystal has a surface which faces the input port; and the molecules of the liquid crystal are aligned substantially perpendicular to said surface when the liquid crystal is in the reflective state. It is further contemplated that the liquid crystal is electrically switchable between the transparent state and the reflective state.

It is still further contemplated that the optical switch further comprise a first transparent element and a second transparent element which sandwich the switchable element therebetween, the first and second transparent elements being disposed such that light from the input port is transmitted through the first transparent element, the switchable element and the second transparent element to the first output port when the switchable element is in the transparent state, and light from the input port is transmitted through the first transparent element, reflected from the switchable element, and transmitted through the first transparent element to the second output port when the switchable element is in the reflective state.

DETAILED DESCRIPTION OF THE PREFERRED EMBODIMENT

The present invention provides for a polarization independent optical switch for selectably controlling the propagation of a complete optical signal from one path to another. The switch lacks many of the drawbacks described above while providing for additional advantages. Although described with regard to particular embodiments, the invention is not so limited. One skilled in the relevant art would understand that particular modifications can be made without departing from the spirit and scope of the invention.

Figure 6:
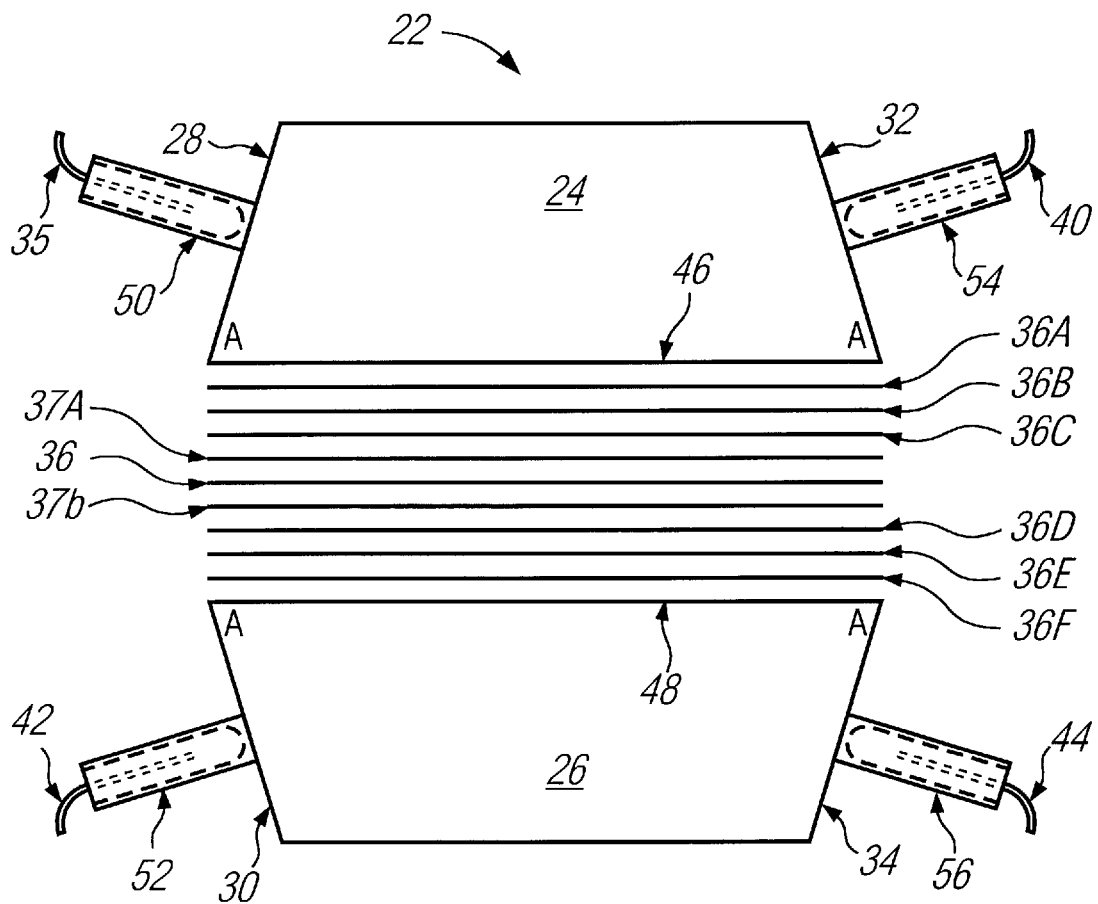
FIG. 6 illustrates a preferred two prism embodiment of the present invention

FIG. 6 illustrates a preferred 2×2 (i.e. two input and two output) embodiment of the present invention for selectably directing the "light" wavelengths between one of at least two different outputs. A Dove prism is used for convenience and illustrative purposes only. Also, the principle of the present invention is applicable to any electromagnetic radiation and is not limited to light wavelengths.

The optical switch 22 incorporates two trapezoidally shaped Dove prisms 24 and 26 with their bases 46 and 48 positioned opposite each other. Any material which is transparent to the wavelength being switched can be used to construct the prisms (e.g. plastic, porcelain, etc.). For example, any material that is amorphous, glassy and solid as opposed to a crystalline or birefringent material. Further, the material should be an organic plastic or siliceous glass and have no light absorption in the near infrared spectral region. Still further, the index of the glass should be greater than the extraordinary refractive index of a positive uni-axial crystal or greater than the ordinary refractive index of a negative uni-axial liquid crystal. Still further, the glass should be of optical quality with no scattering centers, holes or cracks. For example, but not by way of limitation, suitable polymers are polycarbonate, polymethymetacrylate, acrylonitrile, polysulfone, or polyallyl diglcol carbonate as manufactured by Optical Coatings Laboratory, Inc (Santa Rosa, Calif.). Also by way of example, but not by way of limitation, suitable siliceous materials are barium light crowns, special short flint, lanthanum crown, dense flint, and crown flint as manufactured by Schott Optical Glass, Inc. (Duryea, Pa.).

A high index glass such as LaK10 glass by Schott Glass Technologies (Duryea, Pa.). Furthermore, any geometric shape can be used for the prisms (e.g. triangles, pyramids, slabs, rectangles, irregular shapes, spheres, cylinder, etc.)

Sandwiched between the two bases 46 and 48 is an active layer of liquid crystal material 36 for reflecting or transmitting all of the incident light. By "all" it is meant to distinguish from systems wherein only approximately half of the signal is transmitted or reflected. If some of the light is not reflected or transmitted due to a slight degradation of the signal, this is still presumed to be within the scope of the present invention. The generic type of liquid crystals belong to those manufactured by EM Industries, Inc. (Hawthorne, N.Y.) or by Frinton Laboratories (Vineland, N.J.). EM manufactures the ZLI and E mixtures of liquid crystals such as Zli-3412 and E-49. These complex mixtures containing as much as 20 different liquid crystal components. The components forming the mixtures are biphenyl, cyclohexyl, cyclohexane, phenylpyrimidines, terphenyls, dioxanes, and many other classes of organic compounds. The general chemical structure consists of side chains, saturated and unsaturated ring systems, linking groups between the rings and terminal groups. The side chains belong to the following classes: alkyl, alkoxy, alkenyl or alkenyloxy groups. The rings systems consists of two or more aromatic, heteroaromatic, cyclohexyl, or heterosaturated cycles. The linking groups are alkanes, esters, unsaturated groups, azoy, and Schiff bases. The terminal groups which provide dielectric anisotropy are cyano, halogeno, isocyano, trihalomethyl and similar types of strongly electron withdrawing moieties. These chemical mixtures are designed to have a wide mesophase range extending from below to considerably above room temperature. The mixtures have a large dielectric anistropy greater than 20 and a birefringence greater than 0.2. The rotational viscosity if low. The bend elastic force constant is small. Materials having the properties described above are E-44, IR-41 and E-49 manufactured by E. Merck. The desired material has the difference between the extraordinary and ordinary indices of refraction close together. The desirable liquid crystal has a large negative dielectric anisotropy, hut a positive dielectric anisotropy also works. Negative materials require homeotropic alignment in the zero voltage mode; whereas, positive materials need homogeneous alignment.

The liquid crystal material 36 is not a polarizing beam splitter as is used in other prior art devices. Rather it is a completely reflecting or transmitting material as will be described in more detail below.

Sandwiching the liquid crystal material 36, on both sides is a top alignment layer 37A and a bottom alignment layer 37B. Alignment layers 37A and 37B, cause the liquid crystal molecules to align themselves homeotropically to the surfaces 46 and 48 when there is no electric field generated between the two transparent electrodes. Sandwiching these layers is a top anti-reflective ("AR") coating 36C and a bottom antireflective coating 36D. Because the refractive index of the transparent electrodes is high relative to the refractive indexes of the switch body and the liquid crystal, anti-reflective coating (36A, 36C, 36D and 36F) is applied to both sides of each of the two transparent electrodes. These layers prevent insertion losses due to reflection. These anti-reflective coatings also eliminate stray light which contributes to cross-talk. Sandwiching these layers are a top transparent electrode layer 36B and bottom transparent electrode layer 36E. These electrodes are for applying a voltage to the liquid crystal material 36. Sandwiching these layers is another top antireflective coating 36A and another bottom antireflective coating 36F. These additional antireflective layers are for reducing reflection from the transparent electrodes which are highly reflective. It should be noted that although described with this layering configuration, the present invention is not limited so limited and can be designed with additional layers, with fewer layers, or with a different layering format.

Coupled to the sides 28 and 30 are fiber optic input ports 50 and 52 coupled to fiber optic input lines 35 and 42. Fiber optic input ports and lines are well known in the art. Coupled to the sides 32 and 34 are fiber optic output ports 54 and 56 coupled to fiber optic output lines 40 and 44. Fiber optic output ports are also well known in the art. Of course, the input ports can be used as output ports and the output ports as input ports.

A discussion of the operation of the switch 22 follows which describes light entering from the upper left optical fiber 35 and exiting from either the upper right optical fiber 40 or lower right optical fiber 44. This selection is discussed for illustrative purposes only as the switch is bidirectional and light can enter and exit through any fiber (35, 42, 40, 44).

Input light (polarized or unpolarized) enters the switch 22 through the upper left fiber 35. It passes through the upper left input port 50 where the light is collimated. By collimated light, it is meant that the light is non-diverging. The angle A made between the surfaces 28 and 46 (and also between surfaces 32 and 46, 30 and 48, and 34 and 48) is set when the switch body is fabricated so that the light emanating from the input lens 50 strikes the surface 46 at a specific angle. In a particular switch operating state (STATE 1) angle A is equal to or slightly greater than the critical angle determined by the refractive index of the switch 22 and the effective refractive index of the liquid crystal layer 36. The critical angle A is the arcsin of the ratio of the effective refractive, $n_{\it eff}$ index divided by the refractive index of the glass, $N_g$. The incident angle is $\theta t$. Represented as an equation:

$$A = \mathrm{Sin}^{-1}(n_{\it eff}/Ng); \text{ wherein } n_{\it eff} = ne/\mathrm{SQRT}(n_e \, \mathrm{Sin}^2\theta t + no \, \mathrm{Cos}^2\theta t)$$

Under these conditions the light is totally reflected at surface 46 and enters the output port 54 which focuses the light into the output fiber 50. By focusing, it is meant that the light signal passes through the aspheric lens. The effective refractive index of the liquid crystal layer 36 is determined by the strength of an electric field generated between the two transparent electrodes 36B and 36E.

The direction of the optic axis with respect to the polarization of light determines the refractive index $n_{\it eff}$ the light sees. The tilt angle $\phi(z)$ of the liquid crystal with respect to the distance the molecules are from the surface, z determines $n_{\it eff}$.

$$n_{\it eff} + no \, ne/\mathrm{SQRT} \, (n_e \, \mathrm{Sin}^2\phi(z) = no \, \mathrm{Cos}^2\phi(z))$$

In order to obtain the statistically averaged direction of the optic axis, the Gibbs free energy per unit area, G of the system is minimized. $G = \int [F_{e1} + F_{die1}]dz$, where $F_{e1}$ and $F_{die1}$ are the volume density of free energy originating from the elastic deformation with elastic constants, $K_{ii}$ and dielectric interaction with the external field, E.

For a parallel-aligned cell, the elastic free energy density is $F_{e1}=\frac{1}{2}(d\phi/dz)^2(K_{11}COS^2\phi+K_{33}SIN^2\phi)$. The dielectric free energy density $F_{die1}$ is related to the dielectric constants $\epsilon_\perp$ and $\epsilon_{//}$ of the liquid crystal material and the applied electric field, E as $F_{die1}=-\frac{1}{2}\epsilon_0 E^2(\epsilon_{//}COS^2\phi+\epsilon_\perp SIN^2\phi)$.

The following equations give f as a function of voltage, V. The equations are solved iteratively. Given a V, $\phi m$ is determined. Once $\phi m$ is determined then, $\phi$ at a distance z from the surface is calculated.

$$SIN\phi=SIN\phi_m Sin\psi$$

$$\eta=SIN^2\phi_m$$

$$V/V_{th}=2/\pi SQRT(1+\gamma\eta)_0\int^{2\pi}SQRT(1+k\eta\ Sin^2\psi/(1+\gamma\eta\ Sin^2\psi)(1-\eta\ Sin^2\psi))d\psi$$

and $$2z/d_0\int^{2\pi}[(1+k\eta\ Sin^2\psi)(1+\gamma\eta\ Sin^2\psi)/)1-\eta\ Sin^2\psi)]^{1/2}d\psi=_0\int^{sin-1(sin\phi/SQRT\eta)}[(1+k\eta\ Sin^2\psi)(1+\gamma\eta\ Sin^2\psi)/(1-\eta\ Sin^2\psi)]^{1/2}d\psi$$

Figure 12:
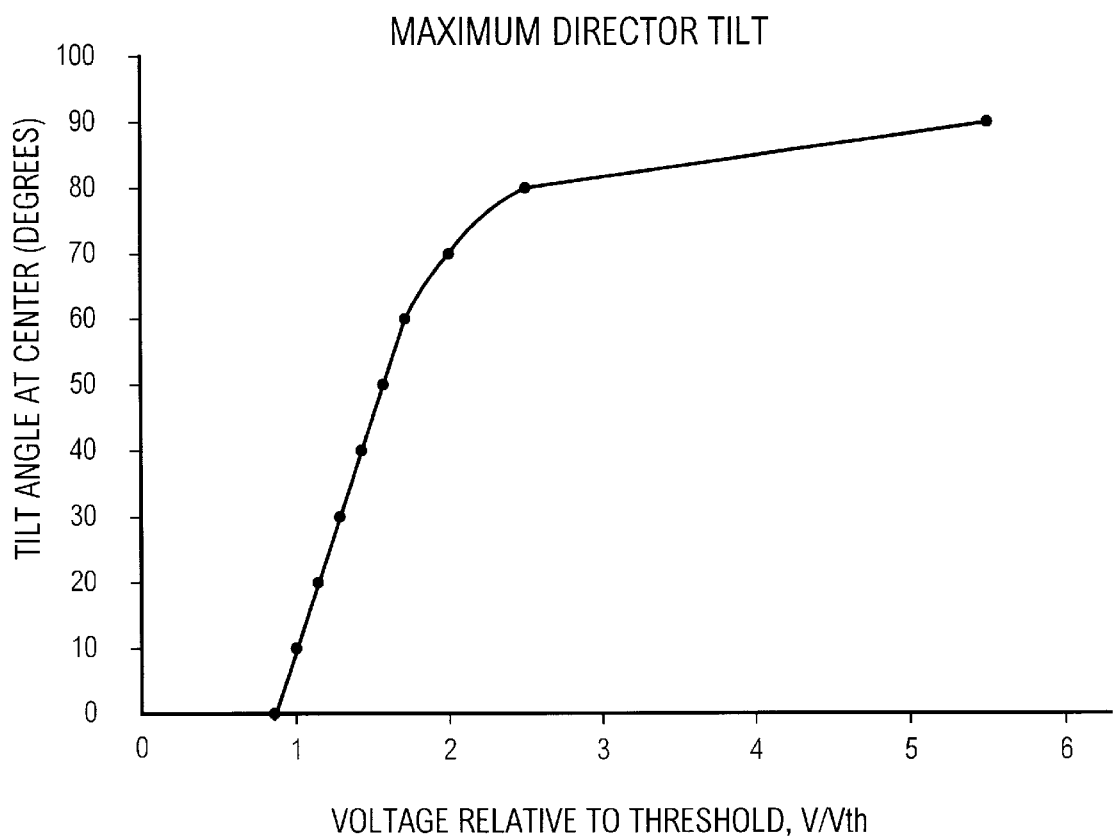
FIG. 12 presents a graph illustrating the relationship between the tilt angle of the molecules in degrees vs. the voltage relative to the threshold.

The threshold voltage $V_{th}$ is given by $V_{th}=\pi SQRT(K11/\epsilon_0\nabla\epsilon)$ In a switch operating state (STATE 2), the strength of the electric field between the two transparent electrodes is adjusted so that the effective refractive index of the liquid crystal is the same as the refractive index of the switch 22. FIG. 12 presents a graph illustrating the relationship between the tilt angle of the molecules in degrees vs. the voltage relative to the threshold. In this state, the light beam crosses surface 46 of prism 24, passes through the liquid crystal layer 36 and enters prism 26 at surface 48. The light passes through prism 26 and enters output port 56 which focuses the light into output fiber 44.

Thus, by changing the strength of the electric field impressed across the liquid crystal layer, the light entering through fiber 35 can be switched between output fibers 40 and 44.

Optical switching with an active beam splitter involves the following parameters to ensure accurate and complete switching of the optical signal: the index of refraction of the glass, the ordinary and extraordinary refractive indices of the liquid crystal material, the incident angle of the light, polarization of light and applied voltages.

There are two types of reflection at a glass surface, external reflection and internal reflection. External reflection occurs when light starts from an air environment and strikes a glass surface. Internal reflection occurs when light starts from within the glass and strikes the internal surface of the glass. Optical switches employ internal reflection. In place of a surface where glass meets air, the surface is the boundary between glass and liquid crystal material. The glass is part of the container holding the liquid crystal material.

If light in the glass meets the liquid crystal material at a critical angle, the light reflects totally. The critical angle depends on the refractive indices of the liquid crystal relative to that of the glass. Most materials like glass or water have only one refractive index. Liquid crystals, on the other hand, have an ordinary refractive index, an extraordinary refractive index and an effective refractive index. The ordinary refractive index is similar to that found in most materials. It does not depend on the alignment of the molecules in the material. In fact, most ordinary materials have a random alignment of molecules. Liquid crystal materials, however, have a well-defined alignment of molecules. The cigar shaped molecules point in the same direction. The direction in which the molecules point is the optic axis. Electric fields, magnetic fields, surface properties and heat all influence this optic axis.

Figure 1A:
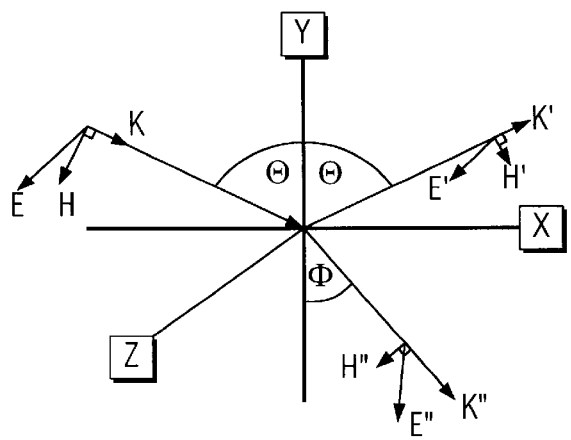
FIGS. 1A and 1B illustrate the spacial relationship, in a cartesian coordinate system, between the propagation direction of the light signal as compared with the electric field and magnetic field in an optical switch.
Figure 1B:
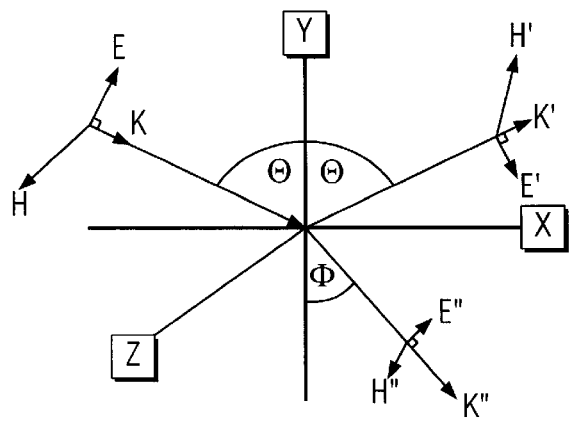
Figure 2:
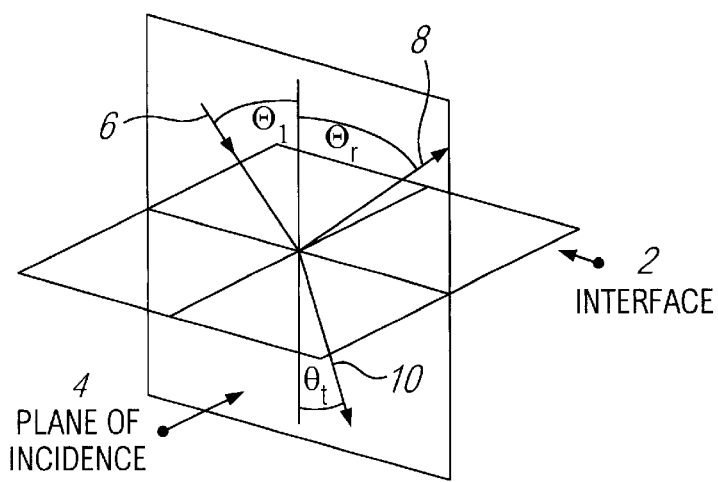
FIG. 2 illustrates the angle of incidence and angle of reflection in relation to the plane of incidence and the interface between the liquid crystal material and a prism.
Figure 3A:
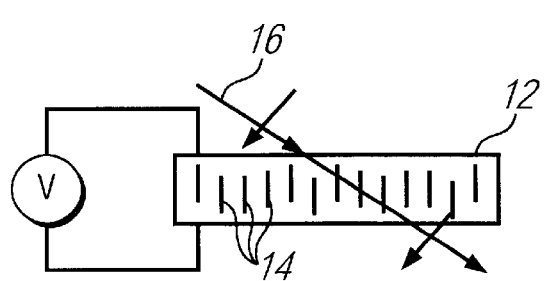
FIGS. 3A and 3B illustrate how an applied voltage to prior art switches manipulates the orientation of the liquid crystal material's optic axis in relation to the longitudinal plane of the liquid crystal material.
Figure 3B:
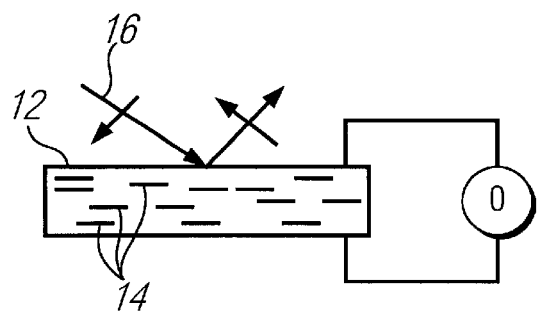
Figure 4A:
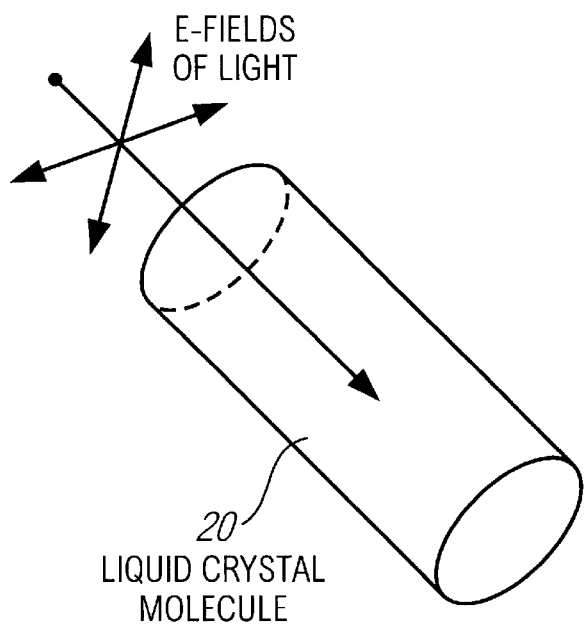
FIGS. 4A and 4B illustrate how the ordinary and extraordinary refractive indexes relate to each other and with respect to a liquid crystal molecule.
Figure 4B:
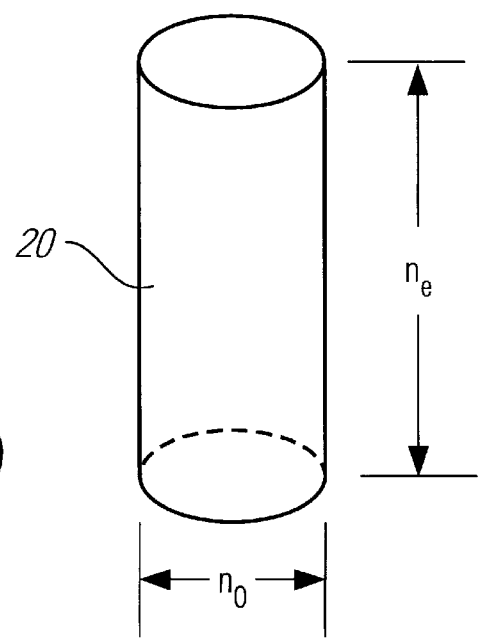

The present invention utilizes two non-zero but different voltages for totally reflecting and totally transmitting states. The voltage for total reflection corresponds to the optic axis normally aligned to the glass surface. The voltage for total transmission corresponds to the optic axis aligned perpendicularly to both polarizations of the incident light or parallel to the direction of propagation. FIGS. 4A and 4B illustrate a liquid crystal molecule 20 and how the ordinary and extraordinary refractive indexes relate to each other. Both polarizations of an incident light correspond to the same refractive index whenever light propagates parallel to the optic axis. The length of the liquid crystal molecule corresponds to the extraordinary refractive index $n_e$. The width of the molecule corresponds to the ordinary refractive index $n_o$. The extraordinary refractive index changes with molecular alignment. The effective refractive index is an average of the ordinary and extraordinary refractive indices. Liquid crystal materials have two classes of critical angles. One relates to the quotient of ordinary refractive index and glass. The former critical angle does not change with the angle the light beam makes with molecular alignment. The latter critical angle does change with the optic axis, the angle the molecules make with the surface.

Figure 5A:
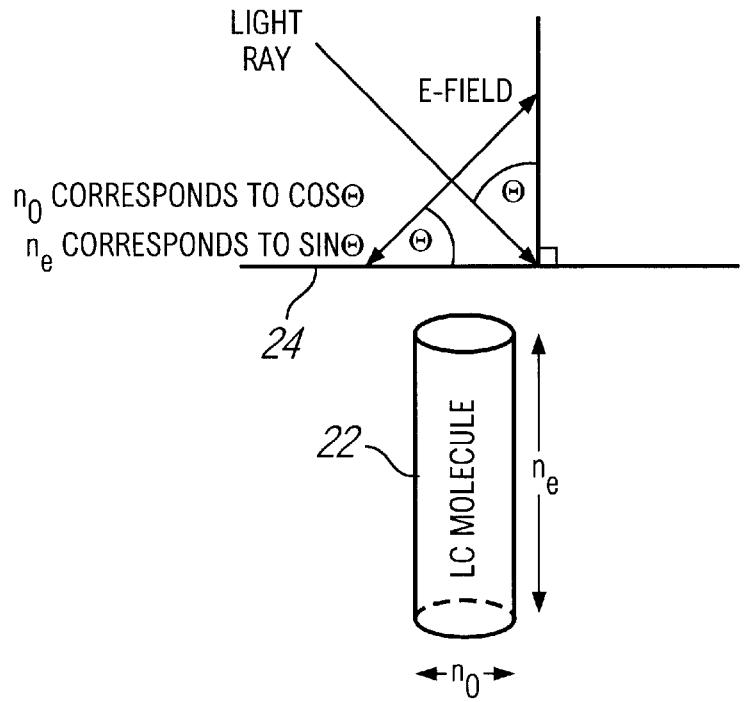
FIGS. 5A and 5B illustrate the relationship between the electric field and the light ray's direction of propagation.
Figure 5B:
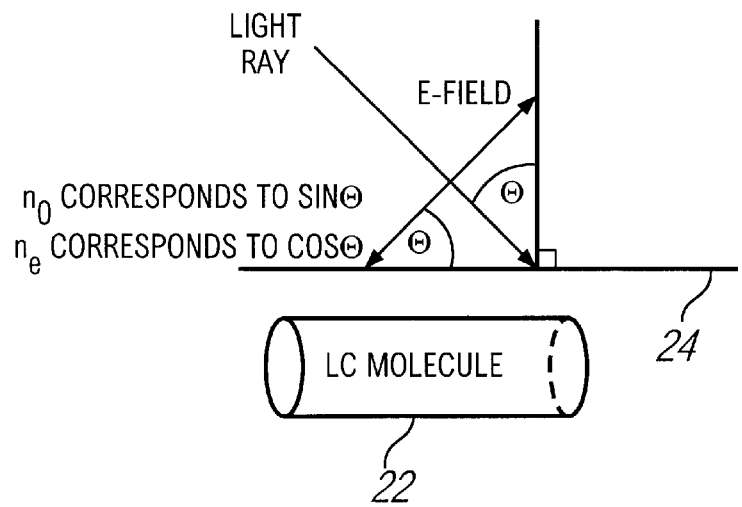

FIGS. 5A and 5B illustrate the relationship between the electric field (E-Field) and the light rays propagation direction. The electric field is perpendicular to the propagation direction of the light ray. The light ray intersects the surface 42 (i.e. a liquid crystal) normal at an angle θ. The electric field of the light ray forces electrons in the liquid crystal molecule 22 to oscillate in perpendicular and parallel directions to the longitudinal axis of the surface 24. Depending upon the orientation of the optic axis, the electric field corresponds to either the ordinary or extraordinary refractive indices of the liquid crystal material.

In other optical switches, ON or OFF electric fields place the optic axis either parallel or perpendicular to the surface. These are the two natural states of the optic axis. In these optical switches, the refractive index of the glass is greater than the ordinary but less than the extraordinary refractive index. There are several ways to design these switches. The optic axis has several possibilities for parallel alignment to the surface. One is parallel to the plane of incidence. Another is perpendicular to the plane of incidence. A third condition is at some arbitrary angle between the parallel and perpendicular arrangements.

With the optic axis normal to the surface, light polarized parallel to the surface totally reflects at the critical angle. If the effective refractive index of the liquid crystal is the same as the ordinary index, then the other polarization totally reflects light. With the optic axis parallel to the surface, the polarization reflected rests on the type of parallel alignment selected.

Electric fields in the present invention align the optic axis either (1) perpendicular to the surface or (2) parallel to the direction of propagation of the incident light ray. The glass refractive index is greater than both the ordinary and extraordinary refractive indices of the liquid crystal material. At an incident angle of zero, with respect to the optic axis, both polarizations correspond to the ordinary refractive index. Both polarizations transmit. At an incidence angle equal to or greater than a critical angle corresponding to the extraordinary refractive index, both polarizations totally reflect off the surface. This occurs with the optic axis normal to the surface. The incident angle with respect to the optic axis is the critical angle. In order to minimize unwanted reflection, the ordinary refractive index is close in value to that of the glass. The extraordinary refractive index is close in value to the ordinary refractive index. The difference between the extraordinary and ordinary refractive indices, the birefringence, is small.

When the refractive index of the glass is greater than both the ordinary, $n_o$, and extraordinary, $n_e$, the critical angle, A, is then the ARCSIN of the liquid crystal extraordinary refractive index to the glass index. When the refractive index of the glass is greater than the ordinary but smaller than the extraordinary index, then the critical angle, A, is the ARCSIN of the effective refractive index to the index of the glass. The effective refractive index is an average given by $COS^2 A/n_e^2 + SIN^2 A/n_o^2$.

The desirable liquid crystal material has negative birefringence. In order to have a small incident angle, the ordinary refractive index lays between 1.5 and 1.6. Other values for the ordinary refractive index less than 1.5 or greater than 1.6 are fungible. Positive birefringent liquid crystal material has an ordinary refractive index close in value to the ordinary refractive index. The desirable liquid crystal material has only a nematic phase. The nematic isotropic transition temperature is in excess of 120 degrees Celsius. The crystalline nematic transition is below minus 20 degrees Celsius. The material absorbs no light between 0.70 μm to 2.0 μm. It has a large dielectric anisotropy with scalar values exceeding 0.2.

The present invention never separates light into orthogonal polarizations. The light input is unpolarized. The selection event does not polarize the light. The light leaves the present invention unpolarized.

Figure 7:
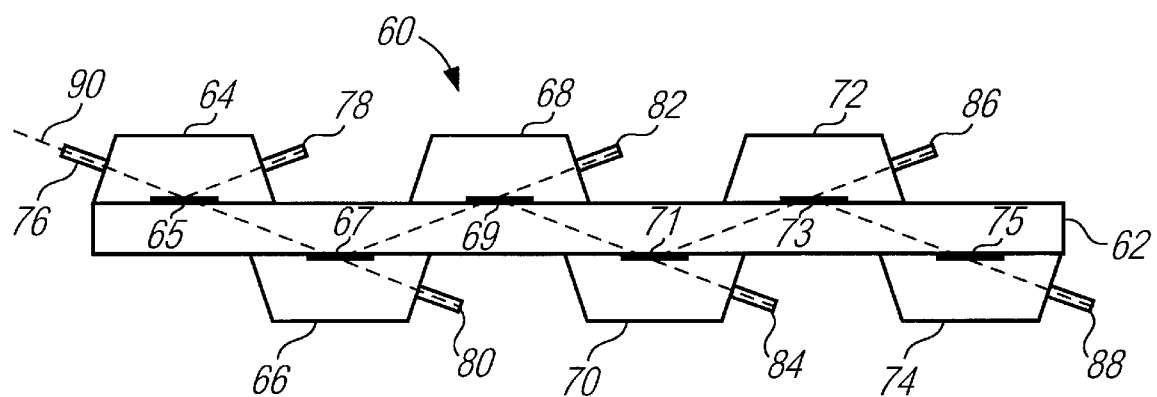
FIG. 7 illustrates a 1×6 switch which incorporates the present invention.
Figure 8:
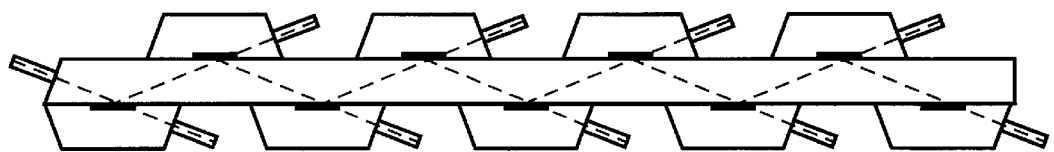
FIG. 8 illustrates a 1×9 switch which incorporates the present invention.

As discussed above, the present invention can be utilized to create larger switches having multiple outputs. For example, FIG. 7 illustrates an alternative 1×6 embodiment 60. Here, the switch is formed from a single main prism 62 and six trapezoidally shaped prisms 64, 66, 68, 70, 72, 74. Sandwiched between each of the six trapezoidally shaped prisms 64, 66, 68, 70, 72, 74 and the single main prism 62 are portions of liquid crystal material 65, 67, 69, 70, 73, 75. A single input 76 coupled to the left most prism 64 allows for input of a light signal 90 into the switch 60. Optical axis' of the liquid crystal material between each prism can then be properly oriented in order to direct the signal to an appropriate one of the output ports 78, 80, 82, 84, 86, 88. FIG. 8 illustrates a larger embodiment of the switch illustrated in FIG. 7.

An input optical signal can be directed to any one of the output ports by selectively applying a particular voltage to particular liquid crystal portions in order to realign their optic axis. For example, the optic axis of the liquid crystal material 65 can be realigned to reflect the light signal from the input port 76 to the output port 78. Alternatively, the optic axis of the liquid crystal materials 65 and 67 can be realigned to transmit the light signal 90 through to the output port 80.

In FIG. 8, the 1×6 switch of FIG. 7 has been extended to include additional output ports by extending the length of the main prism and adding additional trapezoidally prisms. The principle of operation is the same.

Figure 9:
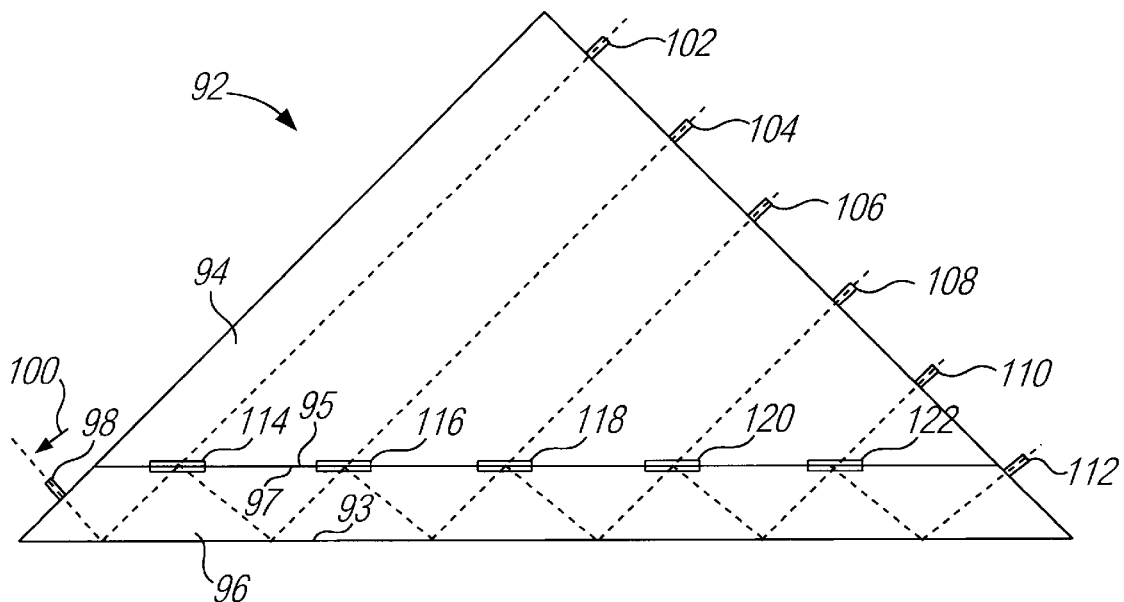
FIG. 9 illustrates an alternative 1×6 embodiment of the present invention.

FIG. 9 illustrates another alternative 1×6 embodiment of the present invention. Here, switch 92 is comprised of a triangularly shaped prism 94 and a trapezoidally shaped prism 96. The base 95 of the triangularly shaped prism 94 and the base 97 of the trapezoidally shaped prism 96 sandwich portions of liquid crystal material 114, 116, 118, 120, 122. An input port 98 is positioned along a side of the trapezoidally shaped prism 96 and five output ports 102, 104, 106 108 and 110 are positioned along a side of the triangularly shaped prism 94. A sixth output port is positioned along an opposite side of the trapezoidally shaped prism 96. Finally, the surface of base 93 of the trapezoidally shaped prism 96 is 100% reflective in order to continuously reflect.

An input optical signal can be directed to any one of the output ports by selectively applying a particular voltage to particular liquid crystal portions in order to realign their optic axis. For example, light signal 100 can be directed to output port 102 by aligning the optic axis in liquid crystal material 114 to allow for a complete transmission of the light signal. Alternatively, the optic axis of liquid crystal layer 114 can be realigned to reflect the light signal 100, thereby reflecting the light signal 100 to the next liquid crystal material 116.

Figure 10:
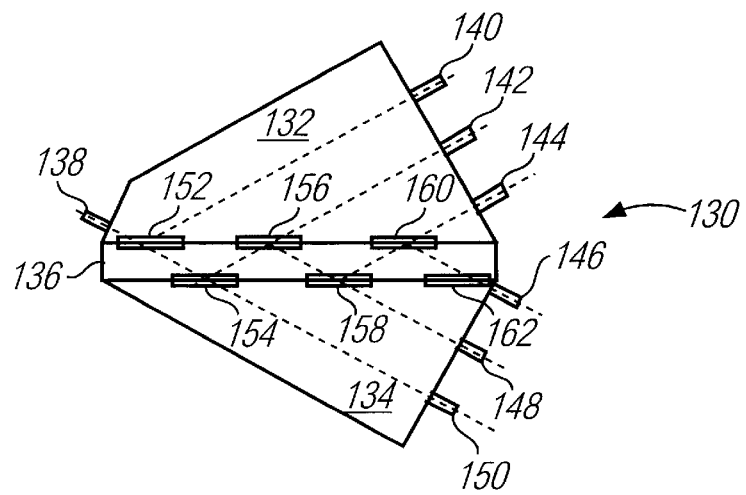
FIG. 10 illustrates yet another 1×6 alternative embodiment of the present invention.

FIG. 10 illustrates yet another alternative 1×6 embodiment of the present invention. Here, switch 130 is comprised of three prisms: a four sided prism 132, a rectangularly shaped prism 136 and a triangularly shaped prism 134. Sandwiched between the four sided prism 132 and the rectangularly shaped prism 136 are portions of liquid crystal material 152, 156 and 160. Sandwiched between the rectangularly shaped prism 136 and the triangularly shaped prism 134 are also portions of liquid crystal material 154, 158 and 162. Although shown here as discrete portions of liquid crystal material, it is apparent that two complete layers of liquid crystal material may also be utilized as this may be easier to manufacture. Coupled to one side of the four sided prism 132 is an input 138. Coupled to another side of the four sided prism are output ports 140, 142 and 144. Coupled to a side of the triangularly shaped prism are three additional output ports 146, 148 and 150.

An input optical signal can be directed to any one of the output ports by selectively applying a particular voltage to particular liquid crystal portions in order to realign their optic axis. For example, a light signal can be directed to output port 140 by aligning the optic axis of liquid crystal material 152 to reflect the light signal from the input port 138 to the output port 140.

Figure 11:
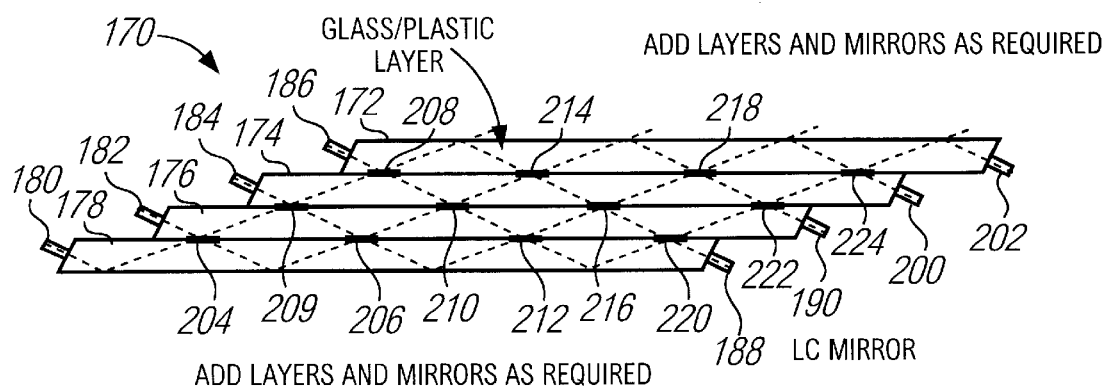
FIG. 11 illustrates yet another N×M switch embodiment of the present invention.

FIG. 11 illustrates another embodiment which includes multiple input ports and multiple output ports. The switch is comprised of multiple layers 172, 174, 176 and 178. Sandwiched between these layers are portions of liquid crystal material 208, 214, 218, 224, 209, 210, 216 and 222. Also, the top surface of the layer 172 and the bottom surface of the layer 178 are coated with some type of reflective coating in order to completely reflect a light signal. This can be accomplished with the AR coating described above or with a layer of liquid crystal material. The reason for these reflective coatings will be described below. As with any of the prisms discussed herein with regard to any of the embodiments, the multiple layers can be formed from the same material.

The switch 170 also includes multiple input ports 180, 182, 184 and 186. The switch also includes multiple output ports 188, 190, 200 and 202. An input optical signal can be directed from any of the input ports to any one of the output ports by selectively applying a particular voltage to particular liquid crystal portions in order to realign their optic axis. For example, a light signal can be directed from input port 184 to output port 202 by aligning the optic axis of liquid crystal materials 208, 214, 218 and 224 to each reflect the light signal. The light signal will therefore bounce within the layer 172 until it exits from output port 202.

FIG. 12 illustrates a graphical illustration of the relationship between the tilt angle of the molecules in degrees vs. the voltage relative to the threshold. This illustrates the proper voltage to apply in order to obtain the proper rotation of the molecules in order to reflect or transmit the optical signal through the optical switch of the present invention. This graph should only be considered as illustrative however, and not as limiting. Different types of liquid crystal material may have varying graphical representations while remaining within the scope and spirit of the present invention.

As these alternative embodiments illustrate, the present invention is not limited to a particular embodiment or number of prisms, inputs or outputs. It is also not limited to a particular prism shape. Rather, it can be implemented with various designs without departing from the spirit and scope of the invention.

Therefore, it is apparent that the present invention solves the drawbacks discussed above with respect to the prior art devices.

We claim:

1. A polarization independent optical switch, comprising:

an input port that receives incoming optical signals;

first and second output ports that output optical signals depending on the switching of the optical switch; and a switchable element disposed between the input port and the first and second output ports, the switchable element having liquid crystal molecules and being switchable between a transparent state in which substantially all of the incoming optical signal is transmitted through the switchable element to the first output port and a reflective state in which substantially all of the incoming optical signal is transmitted through the switchable element to the second output port, the molecules being aligned substantially parallel to the path of the incoming optical signal from the input port when the switchable element is in the transparent state and the molecules being aligned substantially perpendicular to the surface of the switchable element when the switchable element is in the reflective state.

2. The optical switch as in claim 1, in which the switchable element comprises a liquid crystal which is switchable between the transparent state and the reflective state.

3. The optical switch as in claim 2, in which the liquid crystal is electrically switchable between the transparent state and the reflective state.

4. The optical switch as in claim 1, further comprising a first transparent element and a second transparent element which sandwich the switchable element therebetween, the first and second transparent elements being disposed such that light from the input port is transmitted through the first transparent element, the switchable element and the second transparent element to the first output port when the switchable element is in the transparent state, and light from the input port is transmitted through the first transparent element, reflected from the switchable element, and transmitted through the first transparent element to the second output port when the switchable element is in the reflective state.

5. The optical switch as in claim 4, in which the first and second transparent elements comprise first and second prisms respectively.

6. The optical switch as in claim 5, in which the switchable element comprises a liquid crystal which is switchable between the transparent state and the reflective state.

7. A method of selectively switching an optical signal from one input to a predetermined one of a plurality of different outputs, comprising the steps of:

a) providing (i) an input port, (ii) a first output port, (iii) a second output port, and (iv) a switchable element disposed between the input port and the first and second output ports, the switchable element being switchable between a transparent state in which all of the light from the input port is transmitted through the switchable element to the first output port, and a reflective state in which all of the light from the input port is reflected from the switchable element to the second output port;

b) inputting an optical signal into the input port;

c) selectably manipulating the switchable element between a transparent state and a reflective state in order to selectively directing the optical signal to a predetermined one of the outputs.

8. A polarization independent optical switch, comprising:

an input port that receives incoming optical signals;

first and second output ports that output optical signals depending on the switching of the optical switch; and a switchable element disposed between the input port and the first and second output ports, the switchable element having liquid crystal molecules between a set of electrodes and being switchable between a transparent state by applying a first predetermined voltage to the set of electrodes in which substantially all of the incoming optical signal is transmitted through the switchable element to the first output port and a reflective state by applying a second predetermined voltage to the set of electrodes in which substantially all of the incoming optical signal is transmitted through the switchable element to the second output port, the molecules being aligned substantially parallel to the path of the incoming optical signal from the input port when the switchable element is in the transparent state and the molecules being aligned substantially perpendicular to the surface of the switchable element when the switchable element is in the reflective state.

* * * * *